Oct. 3, 1972  R. E. GRIMES ET AL  3,696,002
MICROBIOLOGICAL ISOLATOR
Filed Nov. 24, 1970
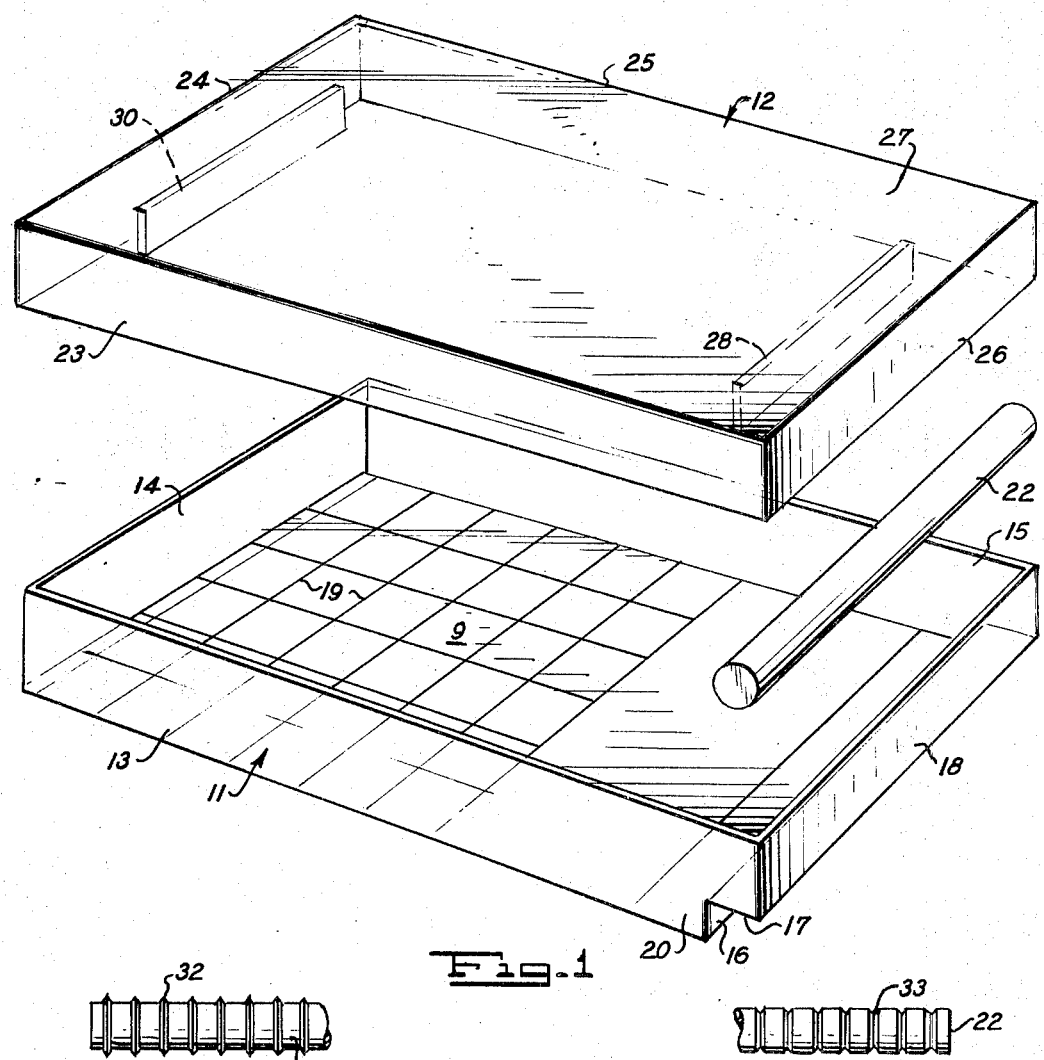
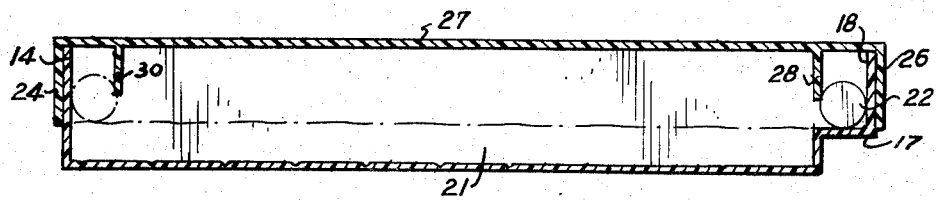
INVENTORS
RAYMOND E. GRIMES &
ROBERT W. BRUEN
ATTORNEYS United States Patent Office 3,696,002
Patented Oct. 3, 1972

3,696,002
MICROBIOLOGICAL ISOLATOR
Raymond E. Grimes, Santa Ana, and Robert W. Bruen, Laguna Niguel, Calif., assignors to Baxter Laboratories, Inc., Morton Grove, Ill.
Filed Nov. 24, 1970, Ser. No. 92,364
Int. Cl. C12k 1/00
U.S. Cl. 195—139                                    13 Claims

ABSTRACT OF THE DISCLOSURE

A relatively flat rectangularly shaped container assembly having a cover, preferably of transparent material, which cover has a depending skirt that encompasses upwardly extending walls of the container. The container is constructed to contain a quantity of gelled material as a culture medium for bacteria and other microorganisms. A roller is positioned at one side for gravity movement from that side to the other side when the cover is removed and the container is inclined, whereby colonies of the microorganisms can be rapidly and uniformly isolated for identification and enumeration.

BACKGROUND OF THE INVENTION

The concept of employing what is known as Petri dishes for growing bacteria colonies is well known. Usually, the prior art Petri dishes have been constructed of glass and usually define a circular lower portion which has an upstanding annular wall adapted to contain a material such as agar or gelatin as the culture medium for the bacteria. The lower portion is covered with a similarly shaped cover having a slightly larger diameter so that it encompasses the lower portion. The Petri dish has been defined as a small shallow dish of thin glass, with a loosely fitting overlapping cover, used for plate cultures in bacteriology.

Of more recent vintage are the Petri dishes constructed of plastic material and, therefore, so inexpensively fabricated that they may be disposed after a single use, thereby eliminating the relatively expensive washing step and sterilization process ordinarily required. The plastic type Petri dishes may be fabricated at the factory and may then have included therein the agar, all under sterile conditions. They can be individually packaged for use in the biological laboratory.

Of even more recent vintage are the devices for culturing bacteria which have particular configurations adapted for certain specific uses, so that there has been a general tendency to move away from the circular Petri dishes popular for many, many years.

When grown on gelled agar and the like culture media, particular bacterial species will present a characteristic morphology. When individual bacteria are sufficiently separate from one another, streaked in colonies on the surface of the culture medium, a visible colony of growth results from each viable cell. These bacterial colonies also exhibit special morphological features which are significant in the identification of the organism.

The art of streaking out a bacterial inoculum over the surface of solid culture media in a Petri dish is well known. Usually, the streaking is carried out with a cotton or synthetic fiber swab or with a suitable wire loop such as a platinum loop. In practice, such streaking requires considerable care and skill and necessitates repeated manual streaking to provide a suitable streak pattern and maximum bacterial isolation.

SUMMARY OF THE INVENTION

The present invention relates to an ingenious culture medium containing device for growing colonies of bacteria. The device is not only useful for growing such colonies within certain specified times under incubation conditions but especially provides integrally therewith an arrangement and assembly for isolating the bacteria inoculant which is administered to the surface near one end of the container of the present invention. This assembly is then utilized to effect an isolation of the inoculant along the major portion of the agar or culture surface in a rapid and uniform manner. This isolation of bacteria is achieved without necessity of resorting to repeated manual streaking and is carried out by gravity movement of a roller which picks up inoculant and deposits discrete colonies along the path of the roller movement.

Generally, the container has a rectangular configuration with a similarly shaped cover. The container has vertical upstanding walls. At one end of the container there is a shelf arrangement adapted to retain an elongated longitudinal roller or cylinder which extends approximately from one side of the container to the other. The cover has downwardly depending sides which encompass the major portion of the upstanding walls of the container. Parallel to the roller and parallel to one side wall of the container is a depending barrier, which is depending from the bottom of the cover and is spaced from the said side wall of the container by slightly more than the diameter of the roller. This depending barrier is designed to retain the roller in a position between the said side wall and the carrier when the cover is in place. When the cover is removed and the container is inclined it is possible to thereby permit the roller to rotate towards the other end of the container which is desirably accomplished as will be explained later. In the preferred embodiment the cover has a second depending barrier at its other end also in spaced relationship of a dimension sufficient to accommodate the diameter of the roller. In this way after the roller has been permitted to move to the opposite end from its normal position, by placing the cover back, the roller is then prevented from returning to its original position even though the container may be inclined in a variety of different directions.

Specifically, in utilization the container is filled with a gelled material such as agar up to a level of the said shelf. The bottom of the container is scored or marked in a grid fashion for determining the number of colonies per grid and as the gelled material is transparent the grid may be observed. In use, the inoculant is distributed along a relatively narrow area on the gelled surface close to and parallel to the roller. When it is desired to distribute the inoculant over the remaining portion of the gelled surface the cover is removed or remains removed and the container is inclined so that the roller will move from its normal end to the other end. As the roller passes over the inoculated area some of the inoculant will then be carried by the roller for distribution over the said remaining gelled surface. The cover is then reapplied so that the container is closed and the device of the present invention may then be incubated so that the colonies of bacteria may continue to propagate.

DETAILED DESCRIPTION OF THE INVENTION

FIG. 1 is a perspective view of the container of the present invention which has been exploded.

FIG. 2 is a side elevational view of the container of the present invention wherein the cover is in position.

FIG. 3 is a side view of a fragment of one embodiment of the roller of the present invention.

FIG. 4 is a fragment view of another embodiment of the roller of the present invention.

Reference numeral 11 designates the container of the present invention without its cover. The cover is shown generally by reference numeral 12. It will be seen that container 11 has a rectangular configuration which can be constructed of glass or plastic. Preferably, the material is a transparent plastic such as is obtained when using an acrylic, polyethylene, polystyrene, polycarbonate or "TPX" (methyl pentene polymer) type plastic material. The container has four upwardly extending side walls 13, 14, 15 and 16. It will be noted that the end of the container 11 having side wall 16 does not extend directly upwardly all the way, as the other side walls, but side wall 16 terminates approximately one half the distance of the other side walls. A horizontally positioned shoulder 17 connects the terminus of the top of side wall 16 and the terminus of the bottom of what might be termed the further extension of a side wall as is designaed by reference numeral 18. It will be appreciated that the horizontal shoulder 17 constitutes what might be termed a shelf and will hereinafter be so designated. The side walls mentioned and a combination of side walls 16 and 18 present a leading edge which is in a horizontal plane. The bottom 9 of container 11 is scored in a grid fashion as shown by reference numeral 19, for instance. Additionally, a score line 20 is positioned in the bottom 9 of the container. Score line 20 is parallel to side wall 16 and is displaced therefrom by a relatively small distance. In practice, a displacement of about one inch from side wall 16 is convenient. The container 11, when in use, is filled with a culture medium, such as agar as shown by reference numeral 21 in FIG. 2. The depth of the agar is such that it is at a level just below shelf 17, for instance.

From FIG. 2 attention is called to the fact that a roller 22 is normally positioned on the upper surface of shelf 17. In FIG. 1, being an exploded view, roller 22 is seen to be above shelf 17, that is, between container 11 and cover 12. The roller 22 has a longitudinal dimension so that it fits comfortably between side walls 15 and 13.

The cover 12 has downwardly depending sides 23, 24, 25 and 26. The shape of the cover is also of a rectangular nature and is of slightly larger dimension so that when it is in position as shown in FIG. 2, the side walls 23, 24, 25 and 26 encompass the side walls of the container 13, 14, 15 and 18, respectively, which can be in a loose fitting manner or equipped with feet to provide suitable clearance as in conventional Petri dishes. The cover has a top web 27.

Additionally, the cover 12 has a skirt 28 which depends downwardly from the bottom of the top web 27 of the cover as shown in FIGS. 1 and 2. This skirt 28 is spaced from side wall 26 and has its ends also displaced to a small dimension from side walls 23 and 25 of the cover. The dimensional displacement between side wall 26 and skirt 28 is such that it is slightly larger than the diameter of the roller 22. Accordingly, when the cover is in position as shown in FIG. 2, depending skirt 28 and side wall 26 effectively contain the roller 22 so that movement off the shelf 17 is prevented.

Similarly, another skirt 30 depends downwardly from the bottom of the top web 27 of the cover at the other end thereof and is displaced from side wall 24 to approximately the same degree as skirt 28 is displaced from side wall 26.

Instead of skirts 28 and 30, the depending barrier for the roller can comprise a plurality of downwardly depending pins or can comprise molded indentations of the cover 25. Instead of employing skirt 30 or a similar such barrier for retaining roller 22 in position after its movement from side wall 18, container 11 can have an upwardly depending and oppositely disposed similar such barrier to form a pocket or cavity along the length of side wall 14, which is not filled with the gelled culture medium and of suitable dimensions and shape for accommodating and retaining roller 22.

The roller 22 can have a smooth outer surface. However, it has been found that if the roller 22 is roughened to a degree or ribbed, the function given to it will be better accomplished. As an example, as can be seen from FIG. 3 the roller 22 may have a plurality of ridges 32. On the other hand, as can be seen from FIG. 4 the roller 22 may have a plurality of circular or annular indentations 33. In a preferred embodiment, these ridges or indentations are substantially equally spaced about 12 to 20 per inch of roller length.

In use, the cover 12 is removed from the container 11, thereby exposing the roller 22 and the surface of the gelled material which, as has been stated, can be agar. The inoculant is taken up by a loop device common in the art or by some other means and is distributed on the surface of the agar in that area between score line 20 and the edge of shelf 17. This may be accomplished by taking the loop, for instance, and sweeping it across that area in a manner parallel to the roller 22. This should be accomplished when the container 11 is in a completely flat or horizontal position or is slightly inclined in a direction so that the roller is urged against side wall 18. Thereafter, after the inoculation step, the container 11 is inclined in the other direction or away from the horizontal, if it has been in this conditon, so that the roller 22 will move off the shelf 17 onto the agar surface and across the agar surface in a direction towards side wall 14. While the container is in this condition the cover is put on the container and the roller thereby is retained at the other end due to downwardly depending skirt 30, which is described in the above. On the other hand, it may be found desirable to discard the roller entirely if the top does not possess a depending skirt 30, for instance. The roller may be dispensed by inclining the container 11 severely so that the roller is actually rolled over the side wall 14 and over the leading edge thereof into a discarded position.

It will be appreciated that as the roller has moved from its quiescent shelf state across the inoculated area it has picked up some of the inoculant and has then distributed the inoculant over substantially the remaining area of the agar. The so inoculated and distributed device of the present invention is then held for incubation purposes in a conventional manner. The colonies as they appear on the surface of the agar may be counted or given further tests as desired. The scored grid at the bottom of the container is visible through the transparent agar so that the grid will provide reference points for counting of the colonies where this is a desired feature. In practice, a grid of one centimeter squares is convenient.

While the device of this invention has been described particularly with respect to manual operation, it will be understood that the device can also be adapted to automatic operation. Thus, the container can have holding means such as grooves or lugs on the outer side walls for retention is automated equipment adapted for removal and replacement of the container cover and inclination or tilting of the container.

The container can be conveniently packaged for sale as a complete unit in transparent plastic or metal foil bags or pouches which can be readily opened prior to use at clinical laboratories, hospitals, doctors' offices, food laboratories, dairies, meat packing houses and similar such institutions having a need for growing and isolating bacteria and various other microorganisms in conjunction with microbiological assays.

Although agar has been particularly described to illustrate the gelled nutrient medium, it will be appreciated that solid culture media for microorganisms other than agar can be employed in the container of this invention, for instance, agarose, gelatin, carrageenin, modified cellulose such as described in U.S. Pat. 3,360,440, cross-linked polyacrylamide as disclosed in U.S. Pat. 3,046,201, irradiated polyethylene and the like natural and synthetic gelling substances.

While there have been shown and described particular embodiments of the invention, it will be obvious to those skilled in the art that various changes and modifications may be made therein without departing from the invention, and, therefore, it is aimed to cover all such changes and modifications as fall within the true spirit and scope of the invention.

We claim:

1. A device for growing and isolating bacteria and the like comprising a substantially rectangularly shaped container, said container having a bottom with upwardly extending side walls each having a leading edge terminating in a plane, a horizontally disposed shelf extending from one of said side walls positioned intermediate the bottom of said container and the leading edge of said side wall, an elongated longitudinal roller extending substantially from one side of the container to the other positioned in said container and having a diameter less than the width of said shelf, said roller being adapted to rest on said shelf, a rectangularly shaped cover, said cover having a top with downwardly depending side walls each having a leading edge terminating in a plane, said top having a larger dimension than said bottom whereby the top encompasses the bottom when the top is positioned on the bottom, said top having a downwardly depending barrier positioned inwardly from one side wall and displaced therefrom by a dimension larger than the diameter of said roller, said barrier adapted to retain said roller in position on said shelf when said top is applied to said bottom.

2. The device of claim 1 wherein the shelf constitutes a shoulder of said side wall of said bottom.

3. The device of claim 2 wherein the shelf is displaced from the leading edge of said side wall by a dimension larger than the diameter of said roller.

4. The device of claim 1 wherein the roller has an uneven surface.

5. The device of claim 1 wherein the barrier is a skirt.

6. The device of claim 1 wherein the bottom is marked with a grid pattern.

7. The device of claim 6 wherein the marks are score lines.

8. The device of claim 6 wherein the marks are caused by raised ridges.

9. The device of claim 6 wherein the device is constructed of transparent material.

10. The device of claim 1 wherein the top has a second depending barrier parallel and displaced from the opposite side wall by a dimension larger than the diameter of the roller.

11. The device of claim 10 wherein the barrier is a skirt.

12. The device of claim 1 wherein the bottom of the container has a quantity of a gelled nutrient medium to a level not greater than the distance from the bottom to the said shelf.

13. The device of claim 10 wherein the bottom of the container has a quantity of a gelled nutrient medium to a level not greater than the distance from the bottom to the said shelf.

References Cited
UNITED STATES PATENTS

| 3,455,788 | 7/1969 | Curry et al. | 195—139 LE |
| 3,623,958 | 11/1971 | Fitzgerald | 195—139 |

ALVIN E. TANENHOLTZ, Primary Examiner

U.S. Cl. X.R.

195—103.5 R